United States Patent [19]

Carr

[11] Patent Number: 5,749,607
[45] Date of Patent: May 12, 1998

[54] JOINT ASSEMBLY EMPLOYING MULTI-RING GASKET

[75] Inventor: Ronald L. Carr, Rainier, Oreg.

[73] Assignee: KC Multi-Ring Products, Inc., Kelso, Wash.

[21] Appl. No.: 347,407

[22] PCT Filed: Jun. 4, 1993

[86] PCT No.: PCT/US93/05343

§ 371 Date: Dec. 2, 1994

§ 102(e) Date: Dec. 2, 1994

[87] PCT Pub. No.: WO93/25836

PCT Pub. Date: Dec. 23, 1993

Related U.S. Application Data

[63] Continuation-in-part of Ser. No. 893,653, Jun. 5, 1992, Pat. No. 5,362,115.

[51] Int. Cl.$^6$ ........................................ F16J 15/00
[52] U.S. Cl. .................... 285/93; 285/363; 285/368; 285/910; 277/180; 277/11; 277/207 A
[58] Field of Search .......................... 285/910, 930, 285/363, 368; 277/180, 235 B, 181, 166, 215, 11, 207 A

[56] References Cited

U.S. PATENT DOCUMENTS

| Re. 11,858 | 9/1900 | Merwarth . | |
| 695,174 | 3/1902 | Roller | 277/11 |
| 925,770 | 6/1909 | Herrick . | |
| 2,442,312 | 5/1948 | Price | 277/11 |
| 2,474,790 | 6/1949 | Rossman | 277/11 |
| 2,532,891 | 12/1950 | Chupp . | |
| 2,871,035 | 1/1959 | Kaiser . | |
| 3,141,685 | 7/1964 | Watts | 285/93 |
| 3,141,686 | 7/1964 | Smith et al. . | |
| 3,302,953 | 2/1967 | Glasgow . | |
| 3,387,867 | 6/1968 | Rogers . | |
| 3,573,870 | 4/1971 | Gastineau | 285/363 |
| 3,909,011 | 9/1975 | Sheesley | 277/11 |
| 4,183,555 | 1/1980 | Martin | 285/93 |
| 4,269,417 | 5/1981 | Dutton . | |
| 4,272,085 | 6/1981 | Fujikawa et al. | 277/180 |
| 4,388,259 | 6/1983 | Jewell et al. . | |
| 4,429,905 | 2/1984 | Valentine | 285/93 |
| 4,516,784 | 5/1985 | Merz . | |
| 4,756,561 | 7/1988 | Kawata et al. . | |
| 4,778,189 | 10/1988 | Udagawa . | |
| 5,090,871 | 2/1992 | Story et al. | 285/93 |

FOREIGN PATENT DOCUMENTS

| 342721 | 1/1904 | France | 285/363 |
| 1125110 | 10/1956 | France . | |
| 2476786 | 8/1981 | France | 277/180 |
| 160239 | 5/1933 | Switzerland | 285/363 |
| 373934 | 1/1964 | Switzerland | 285/363 |
| 9149 | 7/1900 | United Kingdom | 285/910 |
| 547375 | 8/1942 | United Kingdom . | |
| 1061419 | 3/1967 | United Kingdom . | |

*Primary Examiner*—Eric K. Nicholson
*Attorney, Agent, or Firm*—William A. Birdwell, Associates

[57] ABSTRACT

A multi-ring gasket (24) and flanged pipe joint assembly employing such gasket. The gasket (24) for sealing the joint between two flanged pipes of polyvinylchloride, chlorinated polyvinylchloride or fiberglass-reinforced plastic pipe is provided. The gasket (24) has an inner ring (26), an outer ring (28) and a plurality of spokes (30) connecting the inner ring (26) to the outer ring (28). Voids (34), or reduced thickness areas, are formed between the inner ring, the outer ring and the spokes so as to leave substantial space between the flanges at the voids and thereby reduce the uneven distribution of stress on the flanges when the gasket (24) is installed. The joint assembly employing such gasket (24) has a groove (50) disposed in an inside surface of a flange (12 or 16) and has a channel (51) disposed through the flange. The channel (51) is in communication with the groove (50) and, by means of a port (56), an outside surface of the flange.

26 Claims, 4 Drawing Sheets

5,749,607

1

JOINT ASSEMBLY EMPLOYING MULTI-RING GASKET

CROSS REFERENCE TO RELATED APPLICATION

This application is a continuation-in-part of U.S. application Ser. No. 07/893,653, filed Jun. 5, 1992, now U.S. Pat. No. 5,362,115.

BACKGROUND OF THE INVENTION

This invention relates to flanged pipe joint assemblies, and particularly to gaskets for sealing the joint between two pipes of a flanged pipe assembly, assemblies employing such gaskets, and assemblies which permit monitoring and control of the quality of the seal provided by such gaskets.

In the construction of industrial facilities, such as pulp and paper mills and chemical plants, there is usually a need to employ pipe to convey fluids and fluid-like mixtures throughout the facility. Since these materials are typically reactive, modern practice favors the use of polyvinylchloride ("PVC"), chlorinated polyvinylchloride ("CPVC"), fiberglass-reinforced plastic ("FRP") pipe or other essentially chemically inert pipe.

The pipe used in such facilities includes flanges at the ends of the pipe sections for assembling sections of pipe together at a joint, as is commonly understood in the art. Typically, a gasket is placed between the flanges, and the flanges are forcibly held together by bolts inserted through apertures disposed in the flanges and gasket. When the flanges are forcibly drawn together by bolts disposed therethrough, uneven stress distributions around the flange tend to weaken, and ultimately break, the flanges. While PVC, CPVC and FRP pipe used in such installations have the advantage of durability in the caustic and acidic environments of the reactive materials which flow through the pipes, their flanges are particularly susceptible to breakage due to uneven stress distributions.

The gasket provides a seal between the flanges of the pipe sections to contain within the pipe the reactive materials conveyed therethrough. However, gaskets generally allow some fugitive emissions of the reactive materials from the pipe. Moreover, gaskets tend to degrade over time, and ultimately fail, which can lead to substantial fugitive emissions. To minimize fugitive emissions, joint assemblies are typically monitored regularly on an assembly-by-assembly basis. In addition, laws and regulations increasingly limit the release into the environment of fugitive emissions of a wide variety of materials and require the monitoring of such emissions. Such laws and regulations typically impose significant fines and other sanctions for failure to comply therewith.

Accordingly, there is a need for a flanged, plastic pipe joint assembly which employs a gasket that, when the flanges are forcibly drawn together, minimizes the uneven distribution of stress around the flanges so as to minimize the likelihood of damage thereto and which controls fugitive emissions and allows for monitoring the release of fugitive emissions, either on a regular or continuous basis.

SUMMARY OF THE INVENTION

The present invention meets the aforementioned need for an improved flanged plastic pipe joint assembly by providing a gasket made of a substantially flat, chemically inert material having an inner ring disposed adjacent the pipe opening in the flange, an outer ring disposed adjacent the

2 outer periphery of the flange and a plurality of spokes joining the inner ring to the outer ring. The flanges are forcibly drawn together by a plurality of bolts disposed around the flanges and in apertures therethrough. A spoke is provided for each of the bolts, the spokes themselves having respective apertures for receiving the bolts. The remainder of the space between the flanges preferably is void; that is, preferably no gasket material exists in that remaining space. However, more than two rings may be used, and a portion of gasket material thinner than the rings and spokes may be disposed in the space between the rings and the spokes.

In another embodiment, at least one flange of the joint assembly has an annular groove disposed in an inside surface of the flange adjacent the gasket, between the gasket's inner ring and the gasket's apertures. The flange also has a channel therethrough in communication with the groove and, by means of a port, with an outside surface of the flange. The port, preferably has predetermined dimensions so as to allow insertion therein of a fitting through which fluids or other materials may be selectively transmitted or detected, or both, by a tapping mechanism.

Accordingly, it is a principle object of the present invention to provide a novel and improved flanged pipe joint assembly and a novel and improved gasket for use in the assembly.

It is another object of the present invention to provide such a gasket that minimizes the uneven distribution of stress around the flanges from the forcible drawing together of the flanges by fasteners.

It is a further object of the present invention to provide such a gasket wherein a portion of the space between two adjoining flanges of respective pipes at the junction thereof is substantially unoccupied by gasket material.

It is yet another object of the present invention to provide such a joint assembly that provides for detection and control of fugitive emissions in the joint assembly.

It is yet a further object of the present invention to provide such a joint assembly that provides for monitoring releases of fugitive emissions into the environment by detecting fugitive emissions in the joint assembly.

It is another object of the present invention to provide such a joint assembly that provides for selectively introducing inert gas to pressurize the gasket assembly and, thereby, prevent fugitive emissions from leaving the pipe.

It is a further object of the present invention to provide such a joint assembly that selectively removes fugitive emissions that are detected in the joint assembly, minimizing release thereof into the environment.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
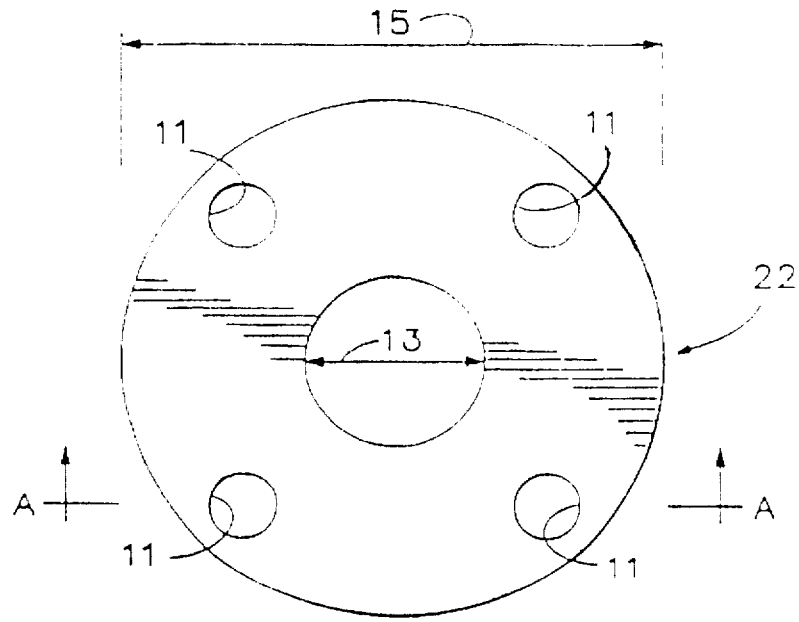
FIG. 1 shows a top view of a conventional flanged pipe joint gasket.

Turning first to FIG. 1, a conventional gasket 22 for a flanged pipe joint assembly typically is annular in shape and has a plurality of apertures 11 for receiving bolts or other fasteners. The inside diameter 13 is substantially equal to the inside diameter of a pipe with which the gasket is to be used, and the outside diameter 15 is substantially equal to the outside diameter of a flange with which the gasket is to be used. Such a gasket may be made of a variety of different materials.

Figure 2:
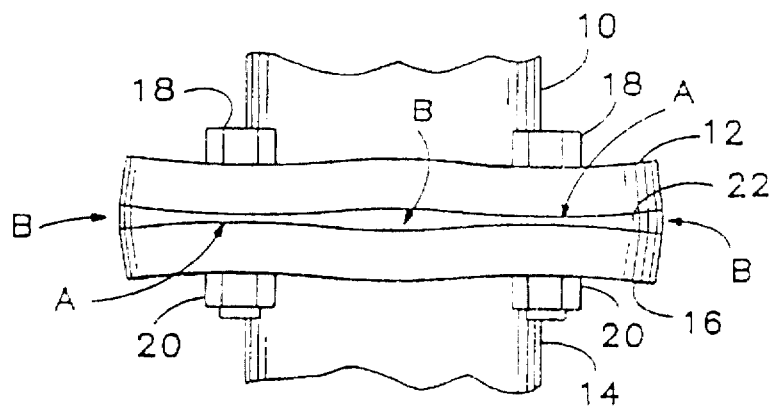
FIG. 2 shows a side view of a flanged pipe joint assembly employing a conventional gasket of the type shown in FIG. 1.

A conventional flanged pipe joint assembly is shown in FIG. 2, wherein a first pipe 10, having a flange 12, is connected to a second pipe 14, having a flange 16, by a plurality of fasteners. The fasteners are typically bolts 18, disposed in circular apertures (not shown) through flanges 12 and 16, and fastened in place by nuts 20, as is commonly understood in the art. A conventional gasket 22, whose apertures 11 correspond to the apertures in the flanges, is disposed between the flanges.

A similar joint assembly is used to connect a flanged pipe to a blind flange, i.e., a flange for closing off the end of a pipe, and to a nozzle, i.e., a flanged outlet from a tank or other container. As used herein, the term "pipe flange", or just "flange", is intended to comprehend blind flanges and nozzle flanges as well as flanges on the end of a pipe.

As can be seen in FIG. 2, when the nuts 20 are tightened onto the bolts 18 so as to forcibly draw the flanges 12 and 16 together, the gasket 22 is compressed in the areas directly beneath the bolts at points A, but resists compression at points B, and thereby causes deformation of the flanges. This is particularly so where the rigidity of the pipe flange is similar to the compressibility of the gasket material, as in the use of PVC, CPVC or FRP pipe.

Figure 3:
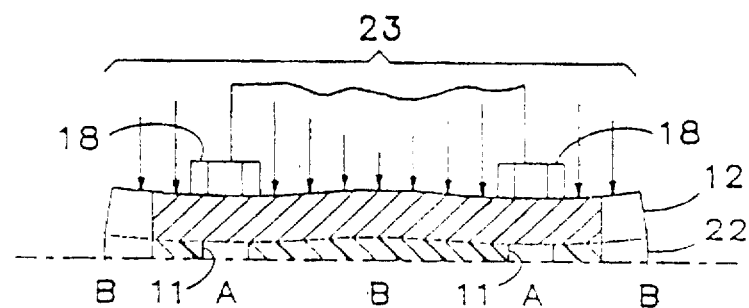
FIG. 3 shows a force diagram for a flanged pipe joint assembly employing a conventional gasket, the force being shown along a line passing through two adjacent bolts of the assembly as shown with respect to a convention gasket by line A—A in FIG. 1.

This can be seen more clearly in FIG. 3 where one flange 12, made of FRP, and one-half of the conventional gasket 22 is illustrated in a force diagram. The bolts 18 are located at positions A, and the flange is most deformed at positions B. The arrows 23 show a typical distribution of force exerted by the flange 12 on the conventional gasket 22 in a state of equilibrium along a line passing through two adjacent bolts of the assembly. It can be seen that, due to the distribution of forces on the flange 12, shown by the arrows 23, the flange undergoes a bending moment, which can cause the flange to distort and eventually break. Indeed, the flange is substantially distorted at points B.

Figure 4:
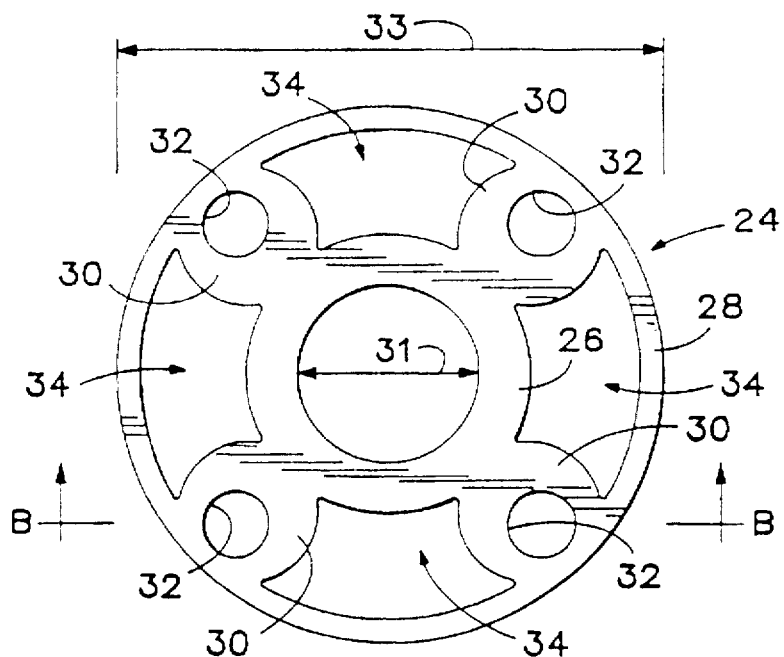
FIG. 4 shows a top view of a gasket according to the present invention.

Turning to FIG. 4, a joint assembly according to the present invention has a gasket 24 that comprises an inner ring 26, an outer ring 28 and a plurality of spokes 30 extending between the inner ring and the outer ring. The inner ring comprises a strip of material formed in a substantially-continuous, annular loop whose outer periphery is greater in diameter than the inner diameter of the flanges. That is, it must be greater than the inner diameter of the pipes or the nozzle and pipe connected thereto, or the pipe to which a blind flange is connected. The outer ring comprises a strip of material formed in a substantially-continuous, annular loop whose inner periphery is greater in diameter than the outer periphery of the inner ring but less than the diameter of the outer periphery of the flanges. Ordinarily, the inside diameter 31 of the inner ring 26 is substantially equal to the inside diameter of a pipe with which the gasket is to be used, and the outside diameter 33 of the outer ring 28 is substantially equal to the diameter of the outer periphery of the flanges.

The spokes have apertures 32 therein for receiving bolts, and the spaces 34 between the inner ring, outer ring and spokes preferably are void. For example, about 40 percent of the area between the two flanges may be separated by voids in the gasket. However, it is to be recognized that, rather than making that area entirely void, gasket material significantly thinner than that which forms the inner ring, outer ring and spokes could be used without departing from the principles of the present invention. It is also to be recognized that more than two concentric rings may be used without departing from the principles of the invention.

The gasket may be made of a substantially flat, relatively inert, compressible material such as the synthetic polymer marketed under the trademark TEFLON by E.I. DuPont De Nemours and Company. Preferably, it is made of the product marketed by W. L. Gore & Associates under the trademark GORE-TEX G-R SHEET. However, it is to be recognized that other gasket material may be used without departing from the principles of the invention.

Figure 5:
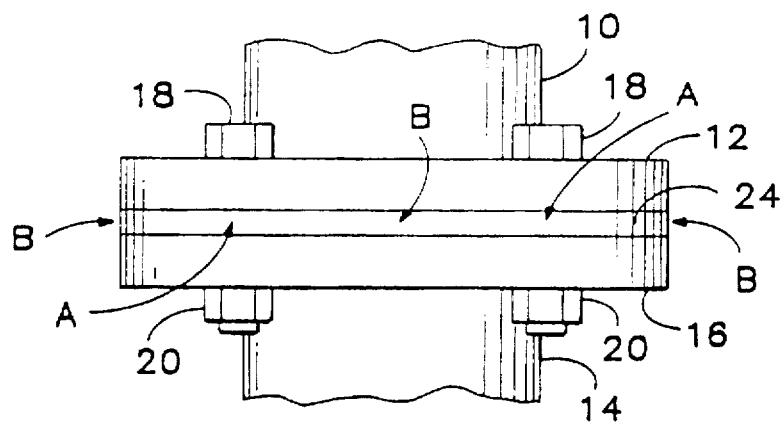
FIG. 5 shows a side view of a flanged pipe joint assembly employing a gasket according to the present invention.

When the gasket 24 is placed in a joint assembly, as shown in FIG. 5, those portions of the flanges 12 and 16 which are disposed adjacent the void spaces 34 do not experience any resistance to movement in the direction of one another and do not experience significant bending moments. Rather, the gasket as a whole generally becomes evenly compressed and the flanges 12 and 16 are not distorted.

Figure 6:
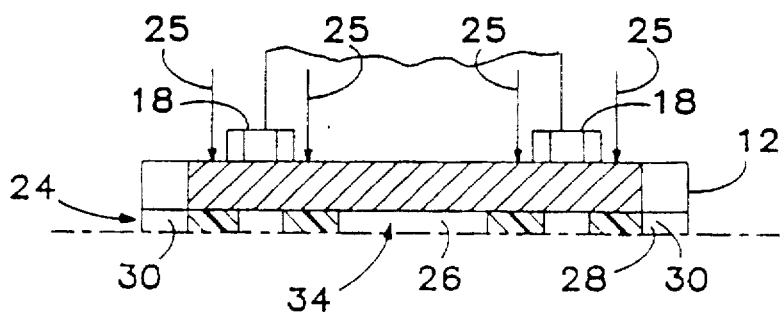
FIG. 6 shows a force diagram for a flanged pipe joint assembly employing a gasket according to the present invention, the force being shown along a line passing through two adjacent bolts of the assembly as shown with respect to a gasket according to the present invention by line B—B in FIG. 4.

Thence, the force diagram for the pipe joint assembly employing a gasket according to the present invention is shown in FIG. 6. Only one flange, made of FRP, and one-half of the gasket 24 are shown. The arrows 25 illustrate the distribution of force exerted by the flange 12 on the gasket 24 of the invention in a state of equilibrium along a line passing through two adjacent bolts of the assembly. As can be seen, there is no significant distortion of the flanges at points B.

In reality, even with the gasket of the present invention, there is likely to be some distortion of the flanges at the periphery thereof. This is due to the presence of the outer ring 28. However, there should be very little distortion in comparison to the use of the conventional gasket shown in FIG. 1. Since the inner ring is located adjacent the openings of pipes 10 and 14, there will be virtually no distortion in that area, as a practical matter. In any event, the bending moments and distortion of the flanges is greatly reduced and the reliability of the joint assembly is thereby greatly enhanced by the use of the gasket according to the present invention.

Figure 7:
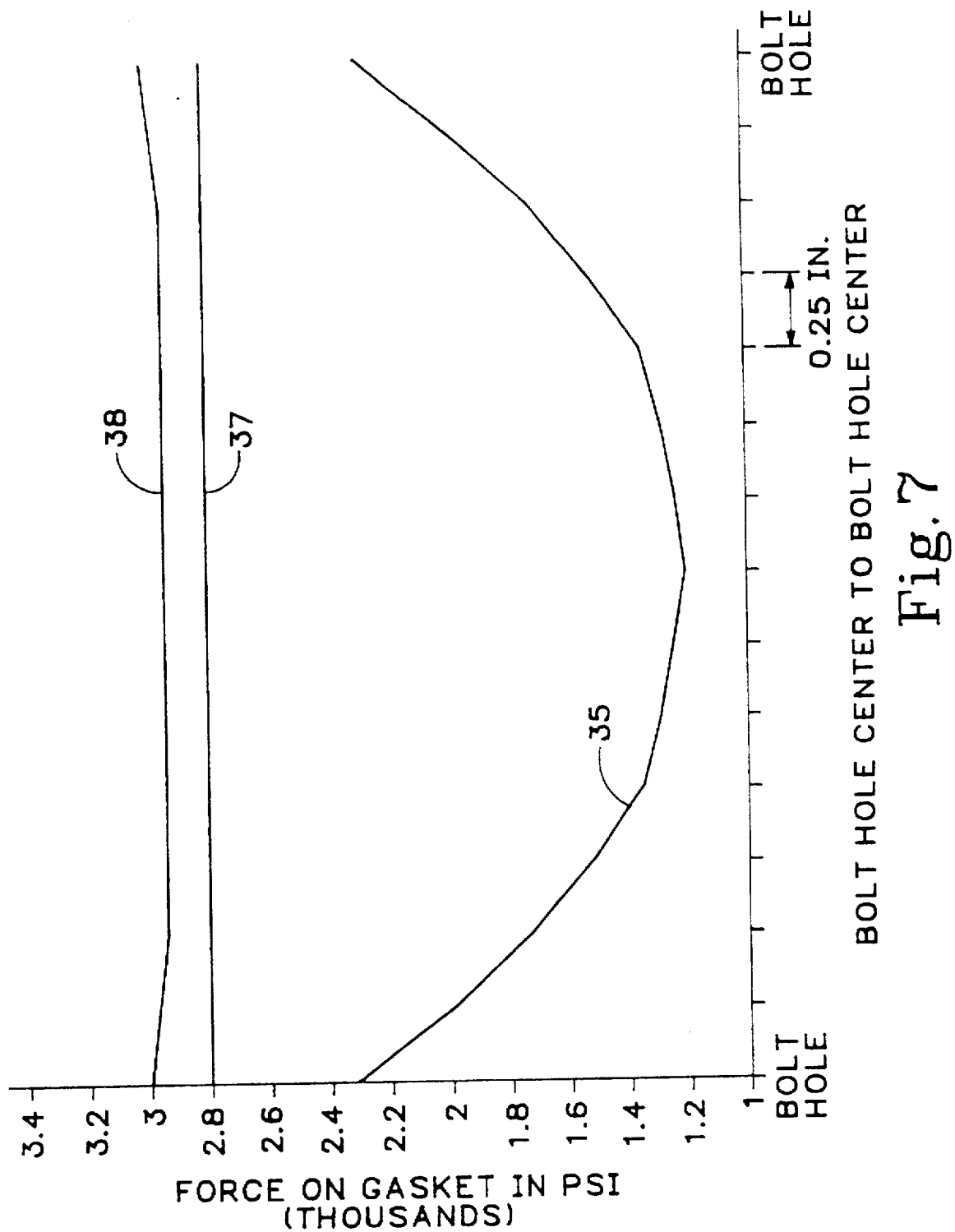
FIG. 7 is a graph of pressure on a conventional gasket, the pressure required to seal a gasket made of a preferred gasket material, and pressure on a gasket according to the present invention, as a function of position between two adjacent bolts.

An advantage of a gasket according to the present invention is that a greater amount of pressure can be applied by the fastening bolts than with the use of a conventional gasket. FIG. 7 shows, at line 35, a graph of the maximum pressure that can ordinarily be applied with a conventional gasket made of GORE-TEX G-R SHEET material, as a function of position between two adjacent bolts, the marks along the horizontal axis representing 0.25 inch increments of distance for a 6 inch diameter flange. It can be seen that, while a maximum pressure of about 2300 psi may be applied at the bolts, that results in only about 1300–1500 psi over most of the distance between the bolts.

Line 37 shows the minimum pressure that must be applied to guarantee a seal using GORE-TEX G-R SHEET material. This material is highly desirable to use because of its chemically inert property. Yet, that amount of pressure cannot be applied to a gasket of conventional design without damaging the flanges because of the non-uniform distribution of pressure and resulting distortion of the flanges.

Line 38 shows a graph of pressure applied with a gasket according to the present invention. GORE-TEX G-R SHEET material allows a pressure in excess of 3000 psi at the bolts, and the gasket of the present invention distributes the pressure more evenly over the portions of the flanges between the bolts and over the rings. In the example shown, the minimum pressure between the bolts is about 2945 psi. As a result, a much more effective seal can be achieved by the gasket of the present invention. In particular, due to the minimal distortion of the flanges, sufficient pressure can be applied to guarantee a seal initially.

In addition, an important feature of the multi-ring gasket is that if the inner ring ruptures, the outer ring still prevents hazardous material from escaping until the gasket can be replaced.

Figure 8:
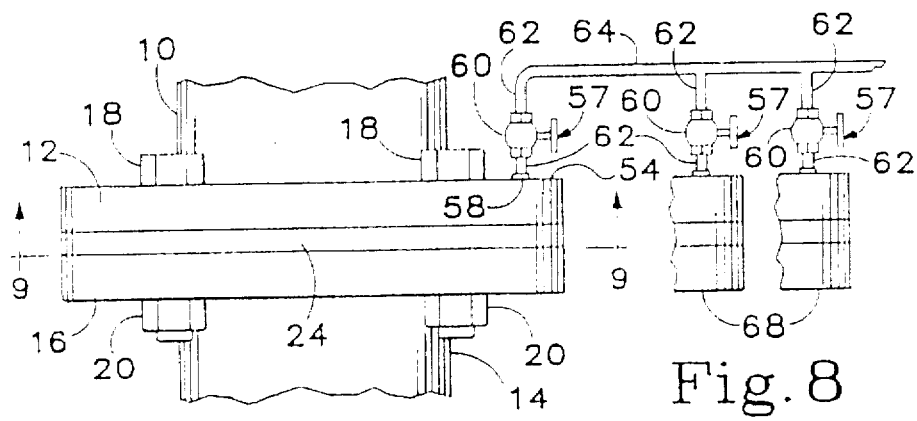
FIG. 8 shows a side view of an alternative embodiment of a flanged pipe joint assembly according to the present invention, having a valve assembly attached thereto.
Figure 9:
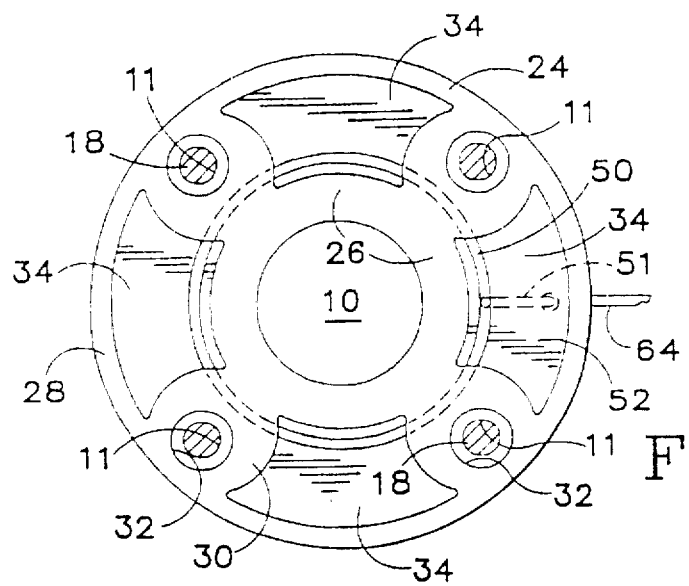
FIG. 9 shows a top sectional view of the flanged pipe joint assembly of FIG. 8, taken along line 9—9 thereof.
Figure 10:
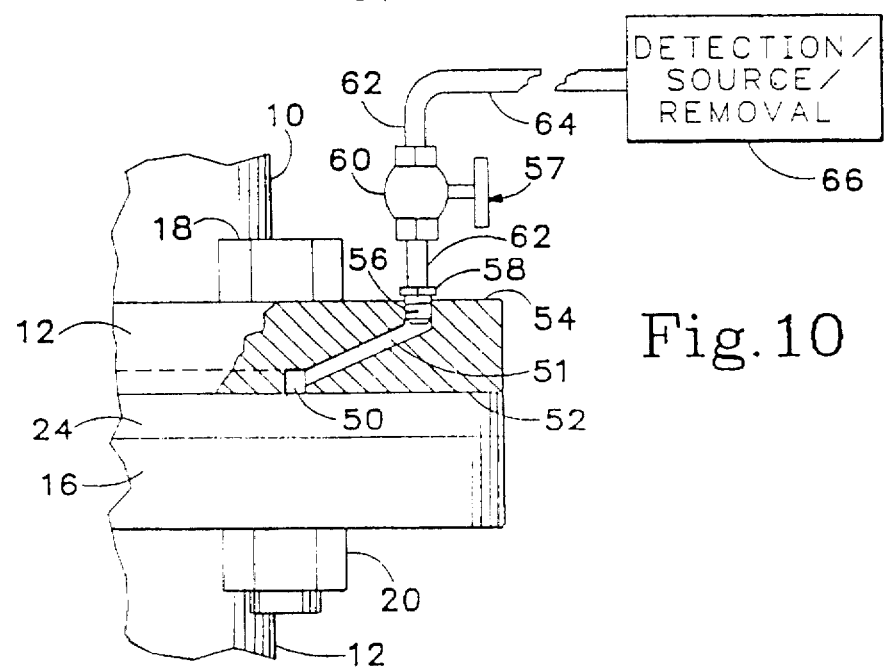
FIG. 10 shows an enlarged side view of a portion of the flanged pipe joint assembly of FIG. 8, in partial section.

Turning to FIGS. 8, 9 and 10, an alternative embodiment of a joint assembly according to the present invention includes a groove 50 and a channel 51 formed in at least one flange 12 or 16. The groove 50 is disposed in an inside surface 52 of the respective flange 12 or 16 adjacent the gasket 24, between the outer periphery of the gasket's inner ring 26 and the inner periphery of the gasket's outer ring 28. As shown in FIG. 9, the groove 50 preferably is disposed so as to be in communication with the gasket's spaces 34 but not with either the apertures 11 through the flanges 12 and 16, the fasteners inserted therein or the apertures 32 of the gasket's spokes 30. The groove 52 preferably is annular, although other shapes may be used without departing from the principles of the invention.

The channel 51 is disposed through the respective flange 12 or 16 and is in communication, at the first end thereof, with the grooves 50 and, at the second end thereof, with an outside surface 54 of the flange. The channel 51 has a port 56 disposed at the second end thereof. The port 56 has shape and dimensions selected so as to connect a tapping mechanism 57 thereto, the tapping mechanism 57 providing for selective transmission of fluids or other materials into or out of the channel 51 and groove 50, or for detection of fluids or materials therein, or both. Preferably, the port 56 comprises a cylindrical aperture of predetermined diameter and depth so that the tapping mechanism 57 may be connected by a fitting 58 inserted in the port 56. As shown, the fitting 58 is threaded so as to self-tap into the port 56, forming a seal that substantially prevents release of fluids or other materials into the environment. It is to be recognized, however, that the tapping mechanism 57 may be connected using means other than a self-tapping fitting, without departing from the principles of the invention.

The mechanism 57, in one embodiment, comprises a valve 60 and tubing 62. The valve 60 is connected to the fitting 58 and to a main tube 64 by tubing 62. The valve 60 may be adjusted to transmit fluids and other materials selectively into or out of the channel 51 and the groove 50 through the tubing 62 and the main tube 64. The main tube 64 preferably is connected to a device 66 that detects, sources, or removes fluids or other materials in the groove 50 and channel 51, or performs some combination thereof, operating in combination with the tapping mechanism 57. Although, as shown, the tapping mechanism 57 and the device 66 are separate, it is to be recognized that they may be a single unit without departing from the principles of the invention. It is preferred, however, to have the device 66 separate so as to connect thereto, by one or more main tubes 64, a plurality of joint assemblies 68, each having a respective tapping mechanism 57, as shown in FIG. 8. It is also preferred that each tapping mechanism 57 and the device 66 are individually controlled from a central location so that each joint assembly 68 can be monitored for fugitive emissions individually and substantially continuously. In this manner, the device 66 may selectively (i) source fluids or other materials, such as inert gas, to pressurize the gasket 24, either to prevent fugitive emissions from entering the gasket or to drive any emissions present back into the pipe 10, (ii) provide a pressure gradient so as to remove fluids or other materials, including fugitive emissions, from the gasket 24 through the tapping mechanism 57, tubing 62 and main tube 64, (iii) detect fugitive emissions, for example by detecting the pressure or changes in pressure within the joint assembly, (iv) detect the pressure of the fluids or other materials introduced into the joint assembly, or (v) combinations of the above.

The terms and expressions which have been employed in the foregoing specification are employed therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An assembly comprising:

(a) a first flange;

(b) a second flange disposed substantially adjacent and parallel to said first flange, thereby defining a joint between said first flange and said second flange, said second flange comprising an inside surface and an outside surface, a groove disposed in said inside surface, and a channel in communication, at one end thereof, with said groove and, at the other end thereof, with said outside surface of said flange;

(c) a first strip of sealing material formed in a substantially-continuous loop having a predetermined shape, said first strip having an outer periphery whose size is greater than the inner periphery of said pipe flanges and being disposed between said first flange and said second flange;

(d) a second strip of sealing material formed in a substantially-continuous loop having a predetermined shape, said second strip having an inner periphery whose size is greater than said outer periphery of said first strip and less than the outer periphery of said flanges and being disposed between said first flange and said second flange;

(e) a plurality of fasteners disposed around said flanges; and (f) a plurality of spokes of sealing material, each disposed between and attached to said first strip and said second strip, and extending between said first strip and said second strip, said first strip, said second strip and said spokes having a substantially uniform thickness between said inner periphery of said flanges and said outer periphery of said flanges.

2. The assembly of claim 1, wherein said groove is disposed in said inside surface of said one of said flanges between said outer periphery of said first strip of sealing material and said inner periphery of said second strip of sealing material.

3. The assembly of claim 1, wherein said spokes form apertures through which said fasteners pass and said groove is disposed so as not to be in communication with said apertures of fasteners.

4. The assembly of claim 2, wherein said groove is annular.

5. The assembly of claim 4, wherein said channel is connected to a tapping mechanism.

6. The assembly of claim 4, wherein said channel is connected to means for detecting fluids.

7. The assembly of claim 4, wherein said channel is connected to means for sourcing fluids.

8. The assembly of claim 4, wherein said channel is connected to means for removing fluids.

9. A method for assembling a pair of pipe flanges, comprising the steps of:

(a) placing said flanges adjacent one another in substantially parallel relation;

(b) placing between said flanges a gasket, said gasket having:

(i) a first strip of sealing material formed in a substantially continuous loop having a predetermined shape, said first strip having an outer periphery whose size is greater than the inner periphery of said flanges;

(ii) a second strip of said sealing material formed in a substantially continuous loop having a predetermined shape, said second strip having an inner periphery whose size is greater than said outer periphery of said first strip and less than the outer periphery of said flanges; and (iii) a plurality of spokes of said sealing material, each disposed between and attached to said first strip and said second strip, and extending between said first strip and said second strip, wherein said first strip, said second strip, and said spokes are formed of a single piece of material;

(c) placing a plurality of fasteners around said flanges; and (d) forcibly drawing said flanges together.

10. A method for assembling a pair of pipe flanges, comprising the steps of:

(a) placing said flanges adjacent one another in substantially parallel relation;

(b) placing between said flanges a gasket, said gasket having:

(1) a first strip of sealing material formed in a substantially-continuous loop having a predetermined shape, said first strip having an outer periphery whose size is greater than the inner periphery of said flanges;

(ii) a second strip of said sealing material formed in a substantially-continuous loop having a predetermined shape, said second strip having an inner periphery whose size is greater than said periphery of said first strip and less than the outer periphery of said flanges; and (iii) a plurality of spokes of said sealing material, each disposed between and attached to said first strip and said second strip, and extending between said first strip and said second strip wherein said first strip, said second strip and said spokes are formed of a single piece of material;

(c) placing a plurality of fasteners around said flanges;

(d) forcibly drawing said flanges together; and (e) connecting a means for detecting fluids or other materials to at least one of said flanges, said one of said flanges having disposed therein a groove adjacent said gasket and a channel providing communication between said groove and said means.

11. A method for assembling a pair of pipe flanges comprising the steps of:

(a) placing said flanges adjacent one another in substantially parallel relation;

(b) placing between said flanges a gasket, said gasket having:

(i) a first strip of sealing material formed in a substantially-continuous loop having a predetermined shape said first strip having an outer periphery whose size is greater than the inner periphery of said flanges;

(ii) a second strip of said sealing material formed in a substantially-continuous loop having a predetermined shape said second strip having an inner periphery whose size is greater than said outer periphery of said first strip and less than the outer periphery of said flanges; and (iii) a plurality of spokes of said sealing material, each disposed between and attached to said first strip and said second strip and extending between said first strip and said second strip:

(c) placing a plurality of fasteners around said flanges;

(d) forcibly drawing said flanges together, said first strip, said second strip and said spokes comprising a single piece of material; and (e) connecting sourcing means for sourcing fluids or other materials to at least one of said flanges, said one of said flanges having disposed therein a groove adjacent said gasket and a channel providing communication between said groove and said sourcing means.

12. A method for assembling a pair of pipe flanges, comprising the steps of:

(a) placing said flanges adjacent one another in substantially parallel relation;

(b) placing between said flanges a gasket, said gasket having:

(i) a first strip of sealing material formed in a substantially-continuous loop having a predetermined shape, said first strip having an outer periphery whose size is greater than the inner periphery of said flanges:

(ii) a second strip of sealing material formed in a substantially-continuous loop having a predetermined shape, said second strip having an inner periphery whose size is greater than said outer periphery of said first strip and less than the outer periphery of said flanges: and (iii) a plurality of spokes of said sealing material, each disposed between and attached to said first strip and said second strip and extending between said first strip and said second strip;

(c) placing a plurality of fasteners around said flanges;

(d) forcibly drawing said flanges together, said first strip, said second strip and said spokes comprising a single piece of material; and (e) connecting sourcing means for removing fluids or other materials to at least one of said flanges, said one of said flanges having disposed therein a groove adjacent said gasket and a channel providing communication between said groove and said sourcing means.

13. An assembly comprising:

(a) a gasket having:
   (i) a first strip of sealing material formed in a substantially-continuous loop having a predetermined shape, said first strip having an outer periphery whose size is greater than the inner periphery of said flanges;
   (ii) a second strip of said sealing material formed in a substantially-continuous loop having a predetermined shape, said second strip having an inner periphery whose size is greater than said outer periphery of said first strip and less than the outer periphery of said flanges; and
   (iii) a plurality of spokes of said sealing material, each disposed between and attached to said first strip and said second strip, and extending between said first strip and said second strip;

(b) a first flange having a substantially planar inside surface;

(c) a second flange having a substantially planar inside surface disposed substantially adjacent and parallel to said first flange and an outside surface said gasket being disposed between said inside surface of said first flange and said inside surface of said second flange, thereby defining a joint, said second flange having an annular groove disposed in said inside surface and a channel in communication, at one end thereof, with said groove and, at the other end thereof, with said outside surface of said flange.

14. The assembly of claim 13, wherein said groove is annular.

15. The assembly of claim 13, wherein said second flange further comprises apertures for receiving fasteners and said groove is disposed so as not to be in communication with said apertures or said fasteners.

16. The assembly of claim 13, wherein said channel is connected to a tapping mechanism.

17. The assembly of claim 13, wherein said channel is connected to means for detecting fluids.

18. The assembly of claim 13, wherein said channel is connected to means for sourcing fluids.

19. The assembly of claim 13, wherein said channel is connected to means for removing fluids.

20. An apparatus comprising:

(a) a plurality of joint assemblies, each joint assembly having an inside and an outside and comprising a gasket having substantially planar, parallel surfaces, a first flange having a substantially planar inside surface, a second flange having a substantially planar inside surface, and communication means for providing communication between said inside and said outside of each said joint assembly, said communication means comprising an annular groove disposed in said inside surface of at least one of said flanges and a channel providing communication between said groove and said outside of said assembly;

(b) tapping means communicating with said channel for selectively tapping each said joint assembly; and (c) interconnection means connected to a plurality of said joint assemblies for selectively detecting, sourcing or removing fluids or other materials in each said joint assembly.

21. The apparatus of claim 20, wherein said tapping means comprises a valve assembly connected to said channel.

22. The apparatus of claim 20, wherein said interconnection means and said tapping means are centrally controlled.

23. A gasket for providing a seal at the joint between a pair of pipe flanges for connecting one flange to the other, the flanges having an inner periphery of known size and shape and an outer periphery of known size and shape, and a plurality of fasteners disposed around the flanges, the gasket comprising:

(a) a strip of sealing material formed in a substantially continuous loop having a predetermined shape, said strip having an outer periphery whose size is greater than the size of the inner periphery of the flanges; and (b) a plurality of spokes of sealing material, each attached to said strip at respective locations of the fasteners, said gasket being formed integrally of a single piece of compressible material having a substantially uniform thickness.

24. The gasket of claim 23, wherein said first strip is substantially annular in shape.

25. The gasket of claim 23, the fasteners having elongate members placed through respective apertures in the flanges and means attached to the elongate members for forcibly drawing the flanges toward one another, wherein said spokes of said gasket comprise respective apertures therein for receiving the elongate members.

26. The gasket of claim 25, wherein said apertures of said spokes are adapted to receive bolts.

* * * * *